United States Patent
Dunn et al.

(10) Patent No.: US 6,643,365 B1
(45) Date of Patent: Nov. 4, 2003

(54) SYSTEM FOR PROVIDING CALLING PARTY SELECTION OF DESTINATION WHEN MULTIPLE TELEPHONES SHARE THE SAME TELEPHONE NUMBER

(75) Inventors: James Patrick Dunn, Northville Township, LaSalle County, IL (US); Joan Marie Richied, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/547,502

(22) Filed: Apr. 12, 2000

Related U.S. Application Data

(63) Continuation-in-part of application No. 08/866,924, filed on May 30, 1997, now abandoned.

(51) Int. Cl.[7] .............................................. H04M 3/42
(52) U.S. Cl. ............................. 379/211.02; 379/221.01
(58) Field of Search ........................... 379/211.02, 229, 379/230, 221.01

(56) References Cited

U.S. PATENT DOCUMENTS 5,465,295 A * 11/1995 Furman .................. 379/201.01
5,692,039 A * 11/1997 Brankley et al. ........... 379/229

* cited by examiner

Primary Examiner—Creighton Smith
(74) Attorney, Agent, or Firm—Michael B. Johannesen; Steven R. Santema

(57) ABSTRACT

A telecommunications system that recognizes "post-fix" codes after directory numbers are dialed. Such post-fix codes provide the calling party with the ability to invoke features or functions before the call is routed. By use of a post-fix code (for example, *X or *XX) the caller may, for example, control routing of a telephone call.

6 Claims, 6 Drawing Sheets

| KEY: DN-555-4444 | | | | |
|---|---|---|---|---|
| CODE | SERVICE | SM | PORT | ACTION |
| 0 | VOICE | 1 | a612 | RING |
| 1 | DATA | 1 | f422 | START |
| 2 | FAX | 2 | a416 | RING |
| 3 | VOICE MAIL | 4 | g133 | NONE |
| 4 | PAGER | 1 | F261 | SPECIAL |
| 5 | | ⋮ | | |

*FIG. 2*

SYSTEM FOR PROVIDING CALLING PARTY SELECTION OF DESTINATION WHEN MULTIPLE TELEPHONES SHARE THE SAME TELEPHONE NUMBER

CROSS REFERENCE TO RELATED APPLICATION

This is a continuation-in-part application of application Ser. No. 08/866,924 filed on May 30, 1997. Now ABN

TECHNICAL FIELD

This invention relates to the field of converged and non-converged telephone networks, and, more specifically, to providing a post-fix code in telephone office dialing plans to permit a calling party to select from one of a plurality of features or functions before the call is routed.

BACKGROUND OF THE INVENTION

"Being in touch" has become increasingly important for some people; i.e., doctors, business executives, attorneys, etc., who have a strong need to be reached wherever they are. Many of these people have a telephone for business, a telephone for home, a mobile cellular telephone for the car and/or a transportable telephone that can be carried around when not near one of the other telephones. Additionally, some professionals have multiple offices with a telephone in each office. Some people work at home and in an office at a business location, with at least one telephone at each location. Further, most professionals now have at least one fax machine, and many have pagers and voice mail. Usually, all of these telephone facilities have different telephone numbers. However, this requires the caller to know or look up multiple telephone numbers and frequently make multiple calls in order reach a person. Some services currently provided by telephone operating companies cause multiple telephones to ring in order to track down a given person. In these systems, each telephone still has an individual number but switching systems cooperate in order to cause ringing to one or more telephone either simultaneously or sequentially. See, for example, Harlow et al., U.S. Pat. No. 5,206,901, which issued Apr. 27, 1993.

Increasingly, the telephone network is providing both voice and data services, whereas in the past these services were provided by separate networks. The resulting network is generally called a "converged network". Converged telephone networks may use a packet network and/or a circuit switched network for all or part of the path. However, the path through packet networks may not provide the quality or privacy desired by a caller. Furthermore, calls initiated in a packet network may specify routing or service capabilities such as fax or data routing that cannot be handled by conventional telephony signaling. Such service parameters may require "packet only" routing or cause the call to fail.

Therefore, a problem in the art is that there is no system to direct call handling or service destinations that the calling party (caller) may desire.

SUMMARY OF THE INVENTION

This problem is solved and a technical advance is achieved in the art by a system that recognizes "post-fix" codes after directory numbers are dialed. Such post-fix codes provide the calling party with the ability to invoke features or functions before the call is routed. By use of a post-fix code (for example, *X or *XX) the caller may, for example, control routing of a telephone call. A plurality of destinations can be associated with the same telephone number, wherein the post-fix code can signal which one of the plurality of destinations that the caller wants. Advantageously, according to one embodiment of this invention, this system A may be implemented in an intelligent network wherein, when a post-fix code is received, a query is made of a centralized database to determine the call destination. Furthermore, if the user does not know the proper code, an audible menu is presented to the user by the destination switch-or alternatively by a centralized control point. Therefore, by use of a post-fix code, the caller signals to the switching network, which provides a system wherein a call can be delivered to a specific one of a plurality of destinations when all of the destinations have the same directory number.

BRIEF DESCRIPTION OF THE DRAWINGS

A more complete understanding of the invention may be obtained from a consideration of the following description in conjunction with the drawings in which:

FIG. 2 is an example of a directory number record for use with post-fix codes.

DETAILED DESCRIPTION

Figure 1:
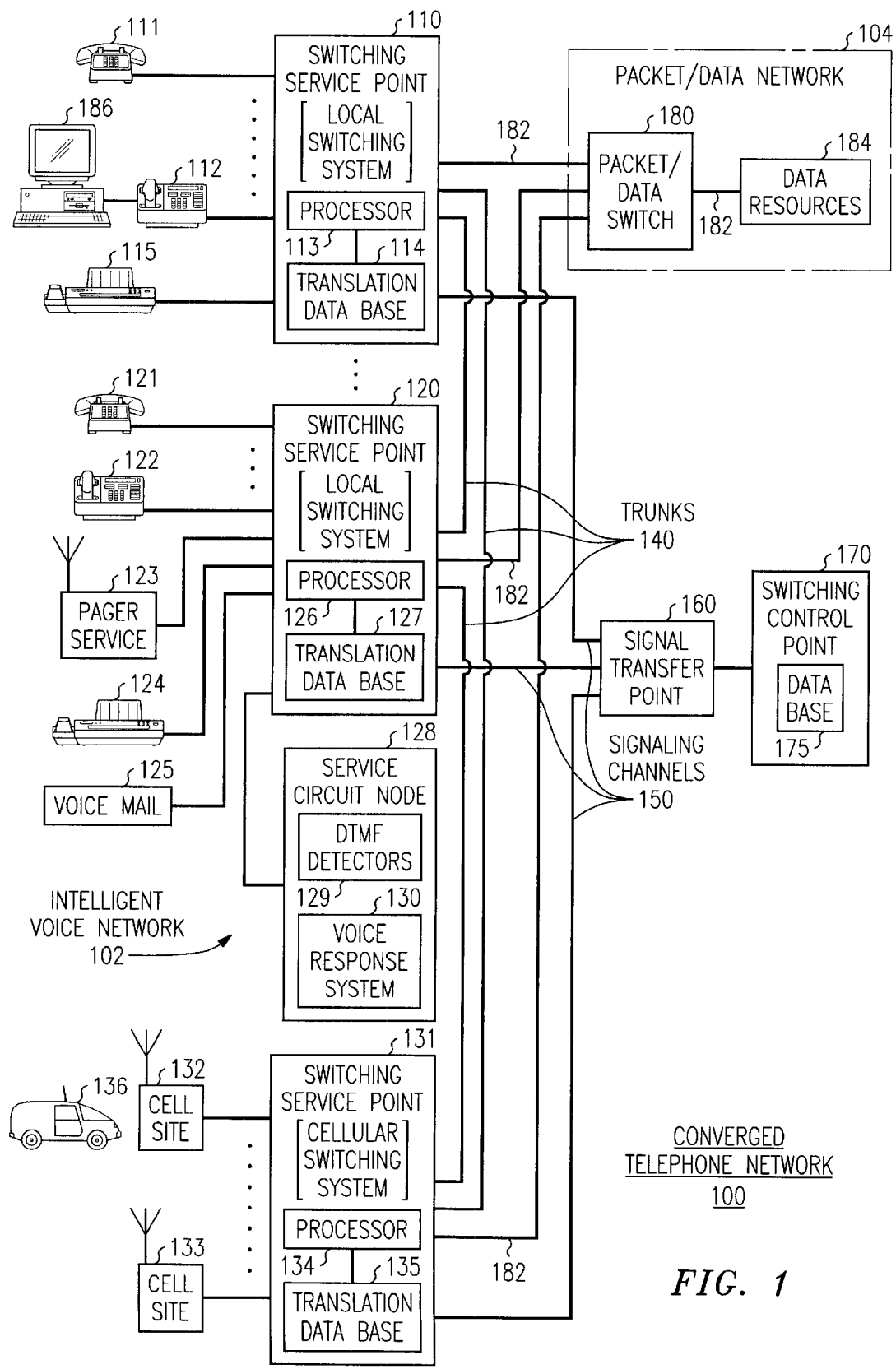
FIG. 1 is a block diagram of a converged telephone network including an exemplary embodiment of an intelligent network that employs post-fix codes for routing purposes.

FIG. 1 shows a simplified block diagram of a converged telephone network 100, wherein an exemplary method of this invention may be practiced. In this exemplary embodiment, converged telephone network 100 comprises a voice intelligent network 102, similar or identical to the intelligent network described in AT&T Technical Journal, Summer, 1991, pages 11–25, and a packet data network 104. Intelligent network 100 comprises a plurality of switching service points (SSP) 110, 120 and 131. Three SSPs are shown in this example for clarity, but an operational intelligent network may comprise more.

SSP 110 is, in this exemplary embodiment, a distributed control, digital switch such as a 5ESS® switch as described in the AT&T Technical Journal, v6 D4, number 6, July/August 1985, pages 1303–1564, the November, 1981 Bell Laboratories Record, page 258, and the December 1981 Bell Laboratories Record, page 290 and is currently manufactured by Lucent Technologies. Alternatively, SSP 110 may be a distributed control, analog or digital switch, such as an ISDN switching system as disclosed in U.S. Pat. No. 4,592,048 issued to M. W. Beckner et al. on May 27, 1986. SSP 110 is connected to a plurality of telephone station sets such as dual tone multi-frequency (DTMF) telephone 111 and integrated services digital network (ISDN) telephone 112 via a plurality of switch modules each having a plurality of ports (not shown for clarity but well known in the art). SSP 110 is a stored program controlled system under control of processor 113. Processor 113 maintains a database of translations 114 for translating directory numbers into line appearances or other call processing treatment (herein "terminations").

SSP 120 comprises, in this exemplary embodiment, a 5ESS local switch similar or identical to SSP 110. A plurality of station sets are connected to SSP 120, such as DTMF telephone 121, ISDN telephone 122, pager service 123, fax machine 124 and voice mail system 125. SSP 120 is controlled by processor 126 which maintains a translation database 127. SSP 120 is also connected to a service circuit node (SCN) 128 which provides centralized services for SSP 120 and other SSPs in intelligent network 100. SCN 128 includes DTMF detectors 129 and voice response unit 130.

SSP 131 comprises a cellular communications system which, in this exemplary embodiment, comprises a Lucent Technologies AUTOPLEX® system 1000. Cellular communications system comprises a plurality of cells, for example 132, 133 connected to a wireless communications system 131 via data links for message communication and communication path trunks. Wireless communications system 131 may be a central processing system or may be a distributed processing system as described in Warty, et al., U.S. Pat. No. 4,827,299, which issued May 2, 1989. Wireless communications system 131 includes a processor 134 and a translation table 135 which records the status of mobile stations, such as mobile station 136, within the cellular communications system. SSPs 110, 120 and 131 are interconnected by a plurality of trunks or channels 140 which provide voice and data communication paths between SSPs. SSPs 110, 120 and 130 are also connected by signaling channels 150. The SSPs use signaling channels 150 to communicate with each other to set up connections and providing special features. SSPs communicate on signaling channel 150 using signaling systems 7 (SS7) protocol in this exemplary embodiment. Signaling channel 150 is connected to signal transfer point 160 (STP), which acts as a signaling switch to receive and forward messages among SSPs, and receives and forwards signaling as necessary to switching control point 170 (SCP). SCP 170 provides a common database 175 for use by all of the SSPs, and other functionalities will be described below.

Packet data network 104 includes packet data switch 180. Packet data switch 180 may comprise, for example, an ATM switch as is known in the art. Packet data switch 180 is connected to switching service points 110, 120 and 131 for example via trunks 182. Packet data switch 180 is also connected to other data resources 184 via another trunk 182. Other data resources 184 may include such things as data bases, high speed networks, the Internet, etc.

In a converged network, a call from, for example, telephone 111 to, for example, mobile phone 136 may be transported via trunks 140 or may be transported through packet data network 104, depending upon the loading conditions. Further, a personal computer such as 186 connected to ISDN telephone 112 may access data resources 184 through switching service point 110, trunk 182, packet data switch 180 and finally to data resources. This data call may be set up either directly from PC 186 or from ISDN telephone 112 according to an exemplary embodiment of this invention.

In one exemplary embodiment of this invention, a caller at telephone 111 calls a person whose home telephone is 121, office telephone is 112, and who also has a pager service 123, fax machine 124 and voice mail 125. Further, the called party has a wireless phone 136. For purposes of describing this invention, all of telephones 122, 112, pager system 123, fax machine 124, voice mail 125 and wireless phone 136 have the same directory Under prior art call processing, each service or telephones would have a unique directory number, and the call from telephone 111 would be processed by processor 113. It would then be routed via one of trunks 140 to switching service point 120. Processor 126 would perform a translation using translation database 127 to determine how to deliver the call. In the prior art scenario, processor 126 would cause one or more connections to be made depending on the specific service described by the call record. For example, the processor 126 could sequentially ring telephone 121 cause a connection to be made back to SSP 110 and then ring telephone 112 and then possibly a connection to SSP 131 which would cause telephone 136 to ring. Ultimately if none of these are answered, then process 126 routes the call to voice mail 125 or pager service 123.

According to this invention, along with the directory number, the caller at telephone 111 enters a post-fix code. It is envisioned that this post-fix code may be a *X or *XX (or even potentially *XXX) depending on available "*" codes. In this exemplary embodiment, * 1 is interpreted as home telephone, *2 is interpreted as fax machine, *3 is interpreted as office telephone, *4 is interpreted as cell phone, *5 pager service, and *6 voice mail service. Therefore, when SSP 110 is receiving digits from 111 it counts digits as is currently practiced in the art, then pauses and waits a predetermined amount of time for a post-fix code to be entered. If no post-fix code is entered, then normal call processing is performned. However, if a post-fix code is entered, then the post-fix code, in one exemplary embodiment, may be forwarded to the terminating switch. The terminating switch can then determine, from translation database 124, which of the possible terminations is desired. Thus, for example, an unimportant message may be directed by the caller to voice mail system 125 or alternatively, the caller could direct the call to a mobile system 136. Alternatively, fax 124 may be directly contacted by fax 115, even if fax 124 shares the same directory number. The user of fax 115 dials the common directory number and a post-fix code (*2 in this example). The service provider (or customer) is thus saved the expense of having additional equipment at the terminating line to determine that a fax connection is required. Thus, only one directory number is necessary to serve a plurality of destinations and a call may be delivered through a default action or through control of the caller using post-fix codes.

In a further embodiment of this invention, when the caller enters a post-fix code at telephone 111, SSP 110 recognizes that a post-fix code was entered and sends the directory number dialed, the post-fix code, and optionally the automatic number identification (ANI) of the calling telephone over signaling channel 150 to signal transfer point 160. Signal transfer point 160 sends the message to switching control point 170. A database query is made in database 175 to determine the treatment for the call. In this exemplary embodiment, the SCP may instruct switch 110 as to which office and which termination in the office to direct the call. Alternatively, SCP 170 may direct both ends of the call to connect to one another by selecting trunks, specifying lines, etc. Further, the SCP 170 may use the optional ANI to determine if there is special treatment given to this particular origination telephone. For example, there could be a private code useable only by a specific caller to access a private line, i.e., telephone 122 using the same directory number as telephone 121.

Alternatively, when a user enters a post-fix code, the call may be directed to the destination switch using standard directory number destination processing. Then this example SSP 120 recognizes a post-fix code and connects the caller to service circuit node 125. SCN 125 prompts the caller for which of several destinations the caller wishes to be connected to. Alternatively, a menu may be presented to the caller as is known in the art and the caller may select using DTMF signaling 129 or voice response system 130. The results of the SCN menu selection is sent back to SSP 120 and the call is completed as selected. It is not important to this exemplary embodiment where the SCN 125 is located. For example, it could be connected to switching control point 170, SSP 110, SSP 130, etc. Information regarding delivery of the call after a post-fix code is entered is the key to this particular invention.

According to a further embodiment of this invention, the user of ISDN telephone 112 and PC 186 may place a call to data resources 184 by dialing an access number (a regular directory number) followed by a post-fix code. SSP 110 then performs a data base look up on the directory number, determines the call is a data call and connects the call directly to packet data switch 180 which then directs the call to data resources 184. In this manner, the switching service point 110 may differentiate between data calls for the data network and the traditional voice type calls.

FIG. 2 illustrates a translation data base (127, FIG. 1) according to an exemplary embodiment of this invention. The primary key for this record is the incoming telephone number, i.e., 555-4444. The post-fix code provides an index into the record. In this exemplary embodiment, code 0 indicates that a voice connection to telephone 121 is desired. Processor 126 then notes that the connection is to SM1 port A612 and the action is to apply ringing signal to telephone 121. Likewise, if the post-fix code is 1, a data connection is desired and the connection is in SM1 port F422. The code 3 is for a fax 124 which connects through port A416 in SM2, and the action of ringing. The code of 3 indicates voice mail 125 which is connected to SM4 at port G133 which has no special action. A post-fix code of 4 indicates that the user's pager 123 is desired which is connected to SM1 port F261. This exemplary table is specific to a 5ESS® switch and more specifically to switch modules therein. The organization of other switches would dictate the arrangement of the fields. For example, most switches do not have switch modules. However, all switches have ports and other actions.

Figure 3:
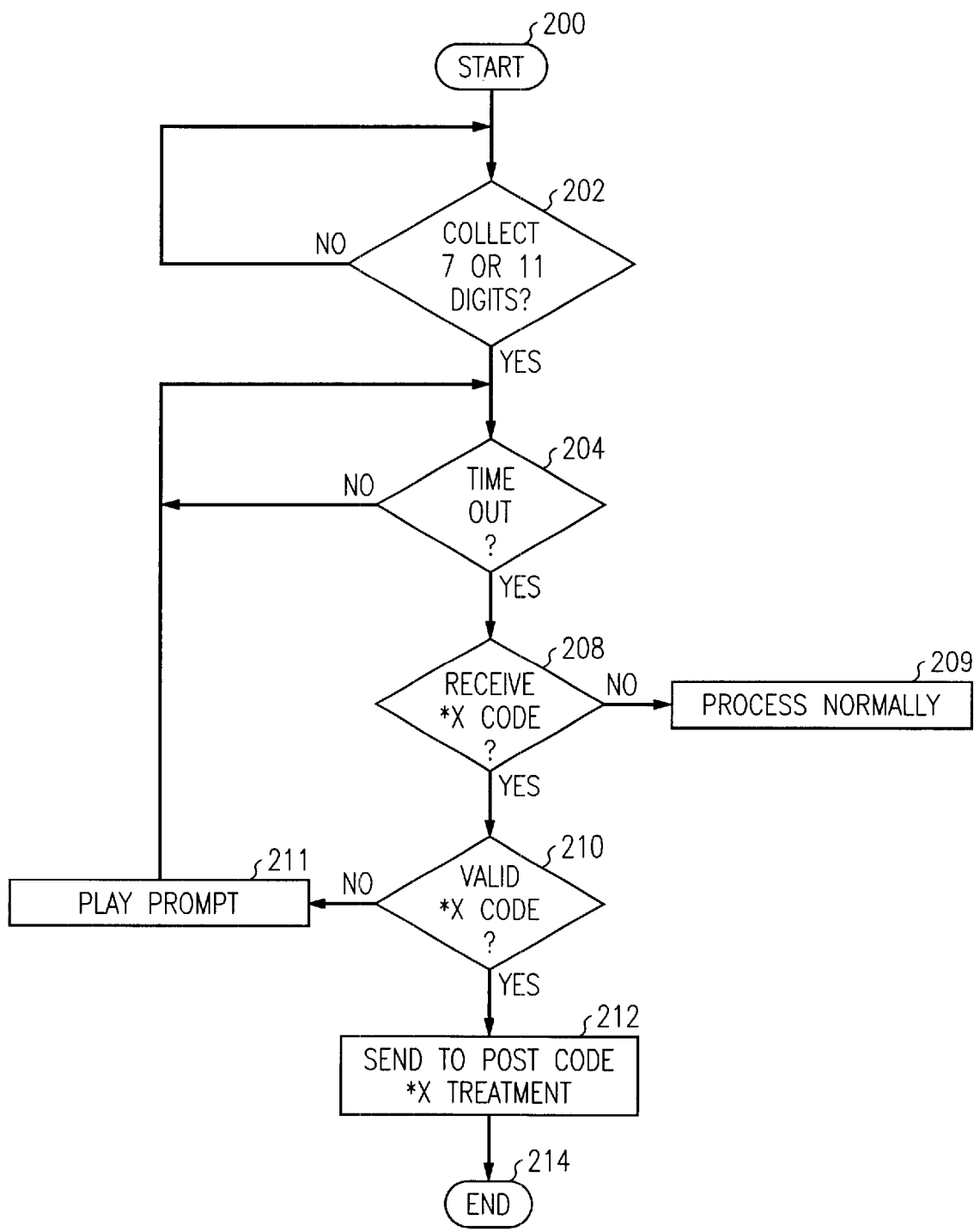
FIGS. 3, 4, 5 and 6 are flow charts of control of the actions of various embodiments of this invention.

Turning now to FIG. 3, a flow chart for processing at an origination office (such as SSP 110 in the previous exemplary embodiment) is shown. Processing starts in circle 200 and moves to decision diamond 202. In decision diamond 202 the standard seven (7) or eleven (11) digits are collected (or the digits associated with an international call). Processing then moves to decision diamond 204 to determine whether a time out has been reached. If a time out has not been reached without entry of a code, processing waits at decision diamond 204. If a time out has been reached, a determination is made if a post-fix code is received in decision diamond 208. If a post-fix code has not been received in decision diamond 208, then the call is processed normally in box 209.

If a post-fix code was received in decision diamond 208, then a determination is made in decision diamond 210 whether the post-fix code is a valid code. If the post-fix code is not a valid code, a prompt is played in action box 211 and then processing proceeds back to decision diamond 204. Processing then proceeds to action box 212 where the post-fix code and the directory number and optionally the directory number of the calling phone (ANI) is delivered to post-fix code treatment. This, as mentioned above, could be on a terminating switch 120 or switching control point 170 or other node and in intelligent network 100. Processing ends in circle 214.

Figure 4:
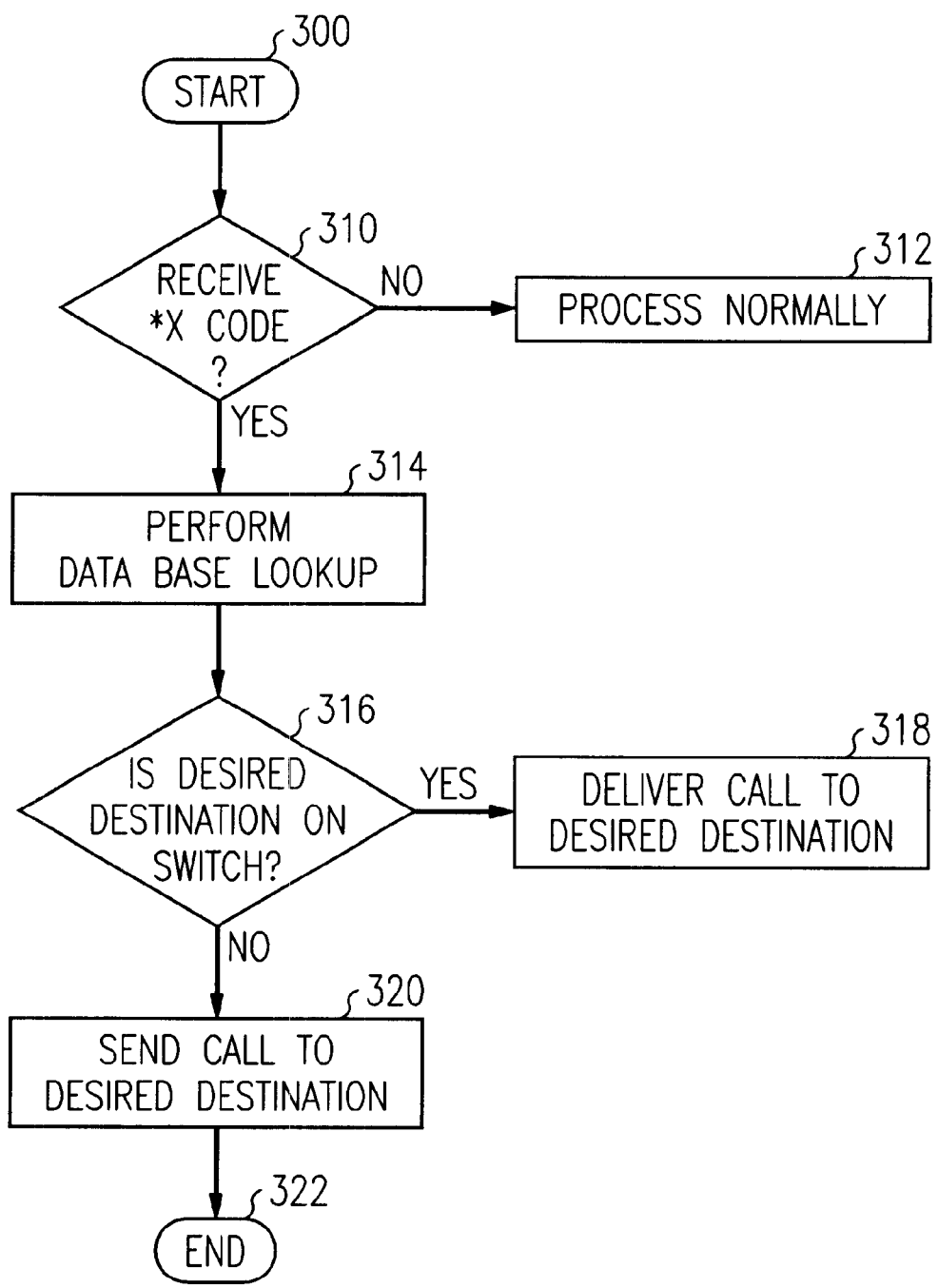
Figure 5:
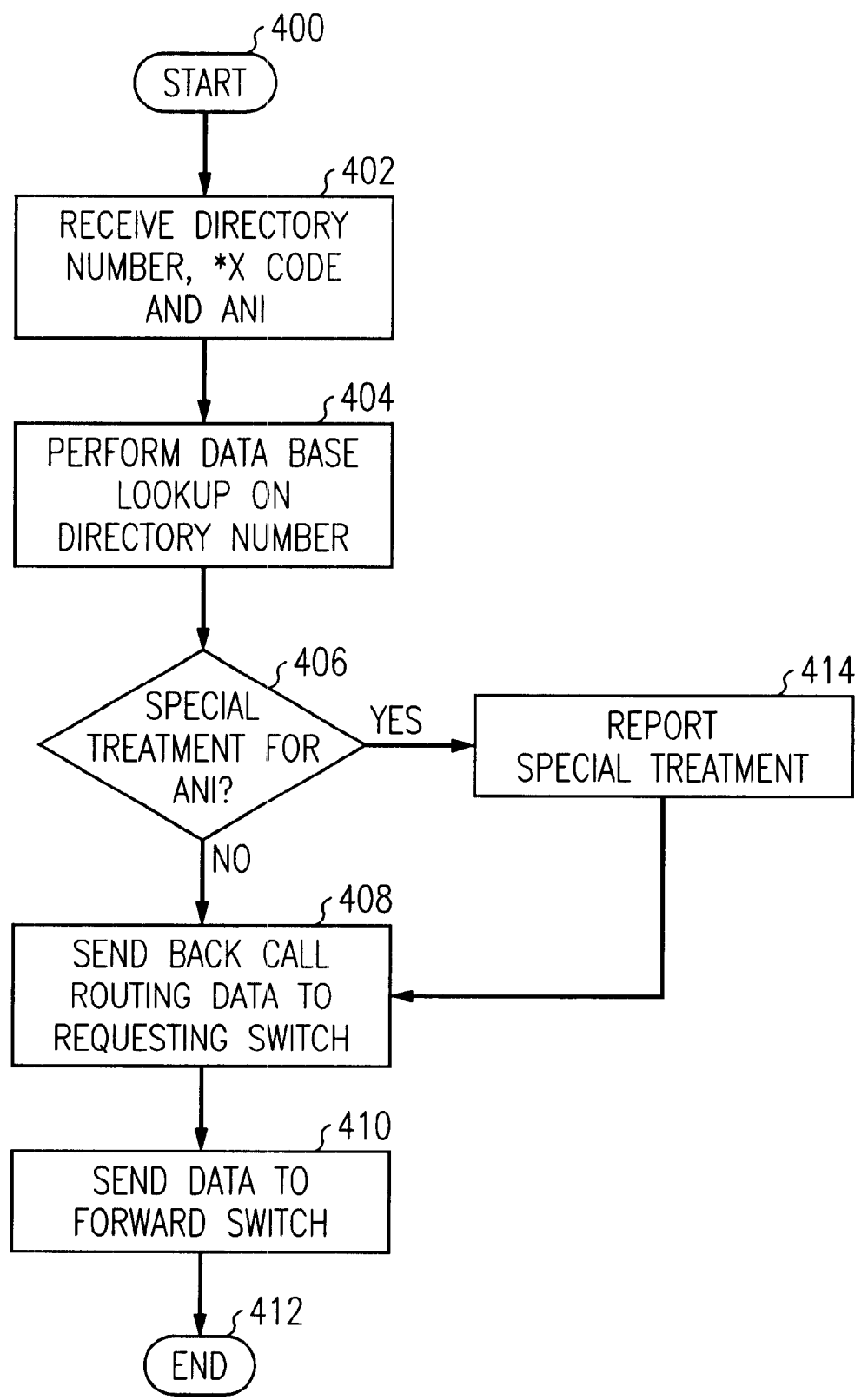

Turning now to FIG. 4, processing, as performed at SSP 120 when it receives a directory number and a post-fix code is described. Processing starts in circle 300. Processing continues to decision diamond 310 where a determination is made if a post-fix code was received. If a post-fix code was not received, the call is processed normally in action box 312. If a post-fix code was received, then processing proceeds to action box 314 where database translation lookup is performed. In this database translation, a lookup is performed to determine which termination is associated with the specific post-fix code. Then processing moves to decision diamond 316 where a determination is made if the desired destination (termination of the call) is connected directly to the serving switch. If it is, then the call is directed to the appropriate line in action box 318 and call processing proceeds as usual. If the desired determination is not attached to the terminating switch, then the call is either redirected to a desired destination in action box 320, or alternatively, the proper routing information may be sent back to the originating switch 110 via signaling channel 150. Processing ends in circle 322. Turning now to FIG. 5, processing that would take place in a switching control point such as SCP 170 is shown. Processing starts in circle 400 and proceeds to action box 402 where SCP receives the DN, the post-fix code and optionally the ANI of the calling telephone. SCP then performs a database lookup using the DN in action box 404 and determines whether the post-fix code receives and/or the ANI receives special treatment in decision diamond 406. If the call does not receive special treatment, then in action box 408 call routing information is sent back to the requesting switch. Optionally, call routing information may be sent to the forward or destination switch in action box 410 and processing ends in circle 412.

If special treatment is determined for the call in decision diamond 406, then the special treatment is performed in action box 414 and the data is sent to the respective switches depending upon what treatment the call is to receive.

Figure 6:
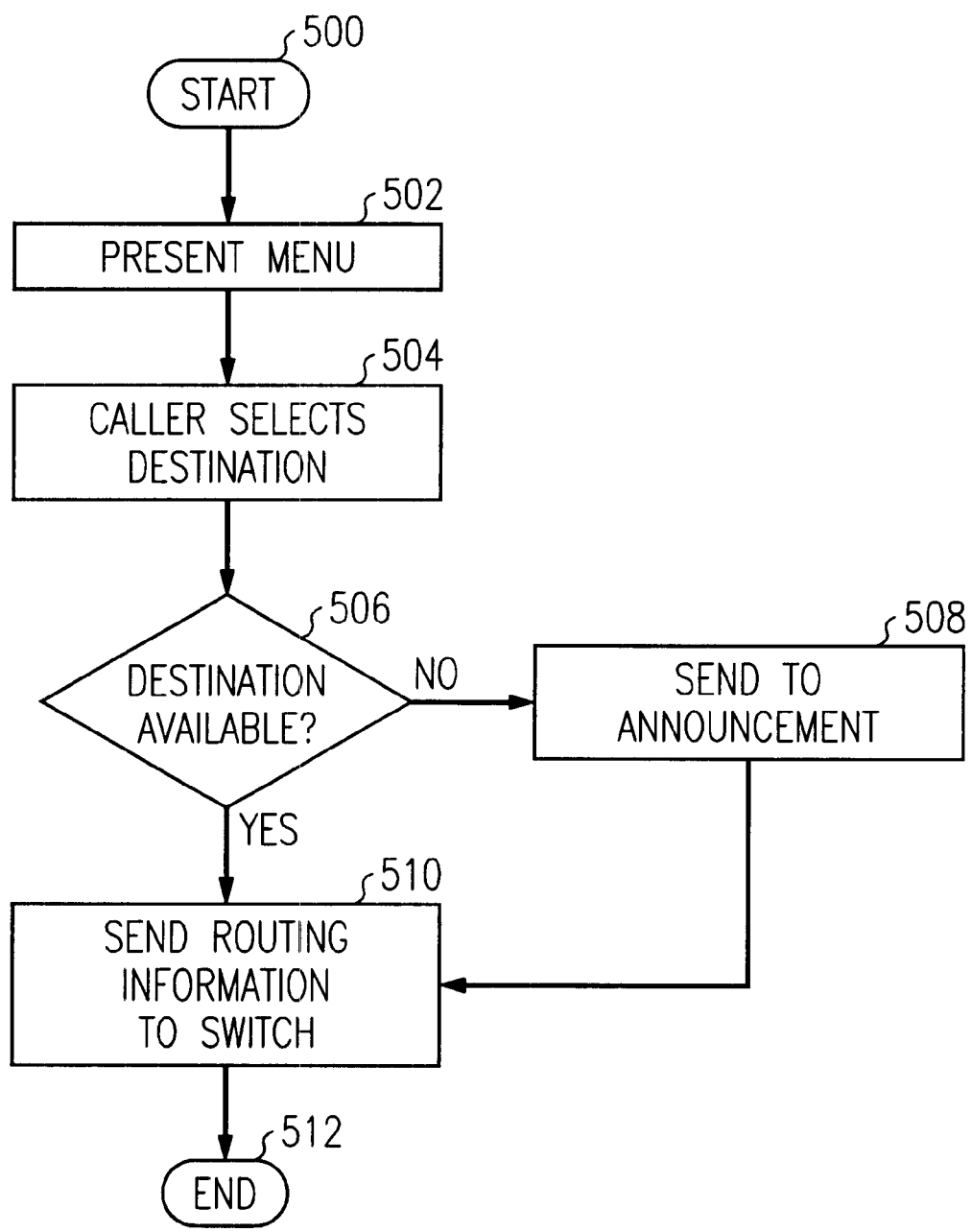

Turning now to FIG. 6, processing as would take place in a menu system such as that described in connection with service circuit node 125 is shown. Processing starts in circle 500 and proceeds to action box 502 where a menu is presented to the caller. The caller then selects a post-fix code in action box 504. A determination is then made if the destination is available in decision diamond 506. If the destination is not available, then in action box 508, the caller is directed to an announcement. If the destination is available then the routing information is sent to the switch in action box 5 1 0 and the call is completed to the specified destination. Processing ends in circle 512.

It is to be understood that the above-described embodiments are merely illustrative principles of the invention and that many variations may be devised by those skilled in the art without departing from the scope of this invention. This invention has been described in terms of routing a call to one of a plurality of destinations that share one directory number. However, other features and functions may be implemented using this unique code. It is, therefore, intended that such variations be included within the scope of the following claims.

What is claimed is:

1. A method for use in a telecommunications system for providing calling party selection of one of a plurality of destinations that share a common directory number, said telecommunications system comprising a service circuit node and a plurality of switches including an originating switch and a terminating switch, each of said plurality of destinations is connected to one of said plurality of switches by a uniquely identified termination, said method comprising the steps of:

initiating a call by entering a directory number and a post-fix code at said originating switch by said called party;

routing said directory number and post-fix code through said telecommunications system according to said directory number, thereby delivering said directory number and said post-fix code to the service circuit node;

said service circuit node translating said directory number to determine a plurality of terminations for said directory number;

said service circuit node selecting one of the plurality of terminations responsive to said post-fix code; and said service circuit node sending the one of said terminations to said destination switch.

2. A method in accordance with claim 1 further including the step of responsive to receipt of said post-fix code, said service circuit node prompting said calling party for further information.

3. A method in accordance with claim 2 wherein said service circuit node includes at least one dual-tone, multi-frequency detector, said method further including the step of said calling party signaling to said service circuit node via dual-tone, multi-frequency signaling.

4. A method in accordance with claim 2 wherein said service circuit node includes a voice response unit, said method further including the step of said calling party signaling to said service circuit node via voice.

5. A service circuit node that facilitates setting up a call from a calling party to a destination when the destination shares a common directory number with a plurality of other destinations, said service circuit node comprising:

means for receiving from an originating switch of a telephone switching system, a directory number and post-fix code entered by the calling party;

means for translating the directory number to a plurality of terminations;

means for selecting one of the plurality of terminations responsive to said post-fix code; and means for sending the one of said terminations to a destination switch of the telephone switching system.

6. A method for use in a service circuit node operably connected to a telephone switching system for providing calling party selection of one of a plurality of destinations that share a common destination directory number, each of said plurality of destinations having a unique termination that defines how the telephone switching system completes a call to the destination, said method comprising the service circuit node performing steps of:

receiving from an originating switch of the switching system, a message having a destination directory number and post-fix code associated with a call from the calling party;

translating said destination directory number to determine a plurality of terminations associated with said directory number;

selecting one of said plurality of terminations responsive to said post-fix code according to a predefined translation of said post-fix code; and sending the one of said terminations to a destination switch of the telephone switching system.

* * * * *